(12) United States Patent
Hegde et al.

(10) Patent No.: US 12,399,291 B2
(45) Date of Patent: Aug. 26, 2025

(54) SYSTEM AND METHOD FOR IDENTIFYING SUBSURFACE STRUCTURES

(71) Applicant: Schlumberger Technology Corporation, Sugar Land, TX (US)

(72) Inventors: Vishakh Hegde, Menlo Park, CA (US); Suhas Suresha, Menlo Park, CA (US); Carlos Boneti, Saratoga, CA (US); Sergey Doronichev, Menlo Park, CA (US); Jose Celaya Galvan, Menlo Park, CA (US); Anthony Lichnewsky, Gatwick (GB)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 942 days.

(21) Appl. No.: 17/595,002

(22) PCT Filed: May 10, 2019

(86) PCT No.: PCT/US2019/031687
§ 371 (c)(1),
(2) Date: Nov. 5, 2021

(87) PCT Pub. No.: WO2020/231379
PCT Pub. Date: Nov. 19, 2020

(65) Prior Publication Data
US 2022/0206176 A1    Jun. 30, 2022

(51) Int. Cl.
*G01V 1/34*    (2006.01)
*G01V 1/30*    (2006.01)
(Continued)

(52) U.S. Cl.
CPC .............. *G01V 1/302* (2013.01); *G01V 1/306* (2013.01); *G01V 1/345* (2013.01); *G01V 20/00* (2024.01);
(Continued)

(58) Field of Classification Search
None
See application file for complete search history.

(56) References Cited

U.S. PATENT DOCUMENTS

| 10,996,372 B2 * | 5/2021 | Denli | .................... G01V 20/00 |
| 11,320,551 B2 * | 5/2022 | Liu | .......................... G06N 3/08 |

(Continued)

FOREIGN PATENT DOCUMENTS

| AU | 2011258764 A1 * | 12/2012 | ............... G01V 1/30 |
| AU | 2011283109 A1 * | 2/2013 | ......... E21B 41/0092 |

(Continued)

OTHER PUBLICATIONS

Extended Search Report issued in European Patent Application No. 19928720.2 dated Nov. 23, 2022, 7 pages.

(Continued)

*Primary Examiner* — Ted W Barnes
(74) *Attorney, Agent, or Firm* — Jeffrey D. Frantz (57) ABSTRACT

A subsurface structure identification system includes one or more processors and a memory coupled to the one or more processors. The memory is encoded with instructions that when executed by the one or more processors cause the one or more processors to provide a convolutional neural network trained to identify a subsurface structure in an input migrated seismic volume, and to partition the input migrated seismic volume into multi-dimensional sub-volumes of seismic data. The instructions also cause the one or more processors to process each of the multi-dimensional sub-volumes of seismic data in the convolutional neural net- (Continued)

work, and identify the subsurface structure in the input migrated seismic volume based on a probability map of the input migrated seismic volume generated by the convolutional neural network.

19 Claims, 9 Drawing Sheets

(51) Int. Cl.
    *G01V 20/00*     (2024.01)
    *G06N 3/04*     (2023.01)
    *G06N 3/08*     (2023.01)
(52) U.S. Cl.
    CPC ................. *G06N 3/04* (2013.01); *G06N 3/08* (2013.01); *G01V 2210/66* (2013.01)

(56) References Cited

U.S. PATENT DOCUMENTS

| | | | | |
|---|---|---|---|---|
| 11,693,139 | B2 * | 7/2023 | Denli | G01V 1/301 |
| | | | | 702/16 |
| 2002/0042677 | A1 * | 4/2002 | West | G01V 1/32 |
| | | | | 702/14 |
| 2002/0183932 | A1 * | 12/2002 | West | G01V 1/32 |
| | | | | 702/14 |
| 2015/0316673 | A1 * | 11/2015 | Wiener | G01V 1/32 |
| | | | | 702/14 |
| 2018/0106917 | A1 * | 4/2018 | Osypov | G01V 1/003 |
| 2019/0041534 | A1 * | 2/2019 | Bandura | G01V 1/307 |
| 2019/0064378 | A1 * | 2/2019 | Liu | G01V 1/28 |
| 2019/0064389 | A1 * | 2/2019 | Denli | G06N 3/08 |
| 2019/0162868 | A1 * | 5/2019 | Salman | G01V 1/30 |
| 2020/0132872 | A1 * | 4/2020 | Dossary | G01V 1/345 |
| 2020/0184374 | A1 * | 6/2020 | Liu | G06F 16/2246 |
| 2020/0292723 | A1 * | 9/2020 | Zhang | G01V 1/301 |
| 2022/0113440 | A1 * | 4/2022 | Griffith | G01V 1/308 |

FOREIGN PATENT DOCUMENTS

| | | | | |
|---|---|---|---|---|
| AU | 2014237334 | A1 * | 10/2015 | ............... G01V 1/30 |
| CA | 3117329 | A1 * | 4/2020 | ............... G01V 1/345 |
| WO | WO-0223222 | A1 * | 3/2002 | ............... G01V 1/28 |
| WO | 2019036144 | A1 | 2/2019 | |
| WO | WO-2019040288 | A1 * | 2/2019 | ............... G01V 1/28 |
| WO | WO-2019055565 | A1 * | 3/2019 | ......... E21B 47/0025 |
| WO | WO-2020009850 | A1 * | 1/2020 | ............... G01V 1/282 |
| WO | WO-2020053197 | A1 * | 3/2020 | ............... G01V 1/301 |
| WO | WO-2020053199 | A1 * | 3/2020 | ............... G01V 1/307 |

OTHER PUBLICATIONS

Waldeland, A. U. et al., "Convolutional neural networks for automated seismic interpretation", The Leading Edge, 2018, 37(7), 9 pages.

International Search report and Written Opinion of the Equivalent PCT/US2019/031687 issued Jul. 26, 2019.

Alregib, G. et al., Subsurface Structure Analysis Using Computational Interpretation and Learning: A Visual Signal Processing Perspective, IEEE Signal Processing Magazine, vol. 35, No. 2, pp. 82-98, Mar. 2018.

Waldeland, A. U. et al., Convolutional Neural Networks for Automated Seismic Interpretation, The Leading Edge, vol. 37, No. 7, p. 529-537, Jul. 2018.

Chen, K. et al., Combining Linear Discriminant Functions with Neural Networks for Supervised Learning, Neural Computing & Applications, vol. 6, No. 1, pp. 19-41, Mar. 1997.

Chang, H.-S. et al., Active Bias: Training More Accurate Neural Networks by Emphasizing High Variance Samples, 31st Conference on Neural Information Processing Systems, Dec. 2017, Long Beach, CA, U.S.A., 11 pages.

Maclin, R. et al., Combining the Predictions of Multiple Classifiers: Using Competitive Learning to Initialize Neural Networks, Proceedings of the 14th International Joint Conference on Artificial Intelligence, Aug. 1995, pp. 524-530.

* cited by examiner

SYSTEM AND METHOD FOR IDENTIFYING SUBSURFACE STRUCTURES

CROSS-REFERENCE TO RELATED APPLICATIONS

This application is a National Stage Entry of International Application No. PCT/US2019/031687, filed on May 10, 2019. The above application is incorporated herein by reference.

BACKGROUND

Operations, such as surveying, drilling, wireline testing, completions, production, planning and field analysis, are typically performed to locate and gather valuable downhole fluids. Surveys are often performed using acquisition methodologies, such as seismic surveys to generate maps of underground formations. These formations are often analyzed to determine the presence of subterranean assets, such as valuable fluids or minerals, or to determine if the formations have characteristics suitable for storing fluids. Hydrocarbons, such as oil and natural gas are examples of such subterranean assets.

Seismic surveying is generally performed by imparting energy to the earth at one or more source locations, for example, by way of controlled explosion, mechanical input, etc. Return energy is then measured at surface receiver locations at varying distances and azimuths from the source location. The travel time of energy from source to receiver, via reflections and refractions from interfaces of subsurface strata, indicates the depth and orientation of such strata. Seismic data, as collected via the receiver, within a volume of interest is referred to as a seismic volume. A seismic volume can be displayed as seismic images based on different sampling resolutions and viewing orientations as well as subject to various different seismic amplitude processing techniques to enhance or highlight seismic reflection patterns.

Seismic images indirectly show the distribution of material deposited over large areas. The spatial (and temporal) variability of stacking patterns, or sequences, observed in seismic images relates to depositional environments and post-depositional processes, such as erosion and tectonic activity. Seismic interpretation examines seismic data (e.g., location and time or depth) to identify subsurface structures that may be indicative of subterranean assets. During seismic interpretation, reflection patterns in the seismic images linking depositional environments and vertical stacking order to sequence of deposition and, thus, relative timing, enables the geological history of the subsurface to be deciphered and leads to estimation of probable sedimentary characteristics. In this manner, a potential hydrocarbon reservoir may be identified and analyzed based on interpretation and analysis of seismic reflection data.

SUMMARY

A system and method for automated identification of subsurface structures by analyzing seismic data are disclosed herein. In one implementation, a subsurface structure identification system includes one or more processors and a memory coupled to the one or more processors. The memory is encoded with instructions that when executed by the one or more processors cause the one or more processors to provide a convolutional neural network trained to identify a subsurface structure in an input migrated seismic volume, and to partition the input migrated seismic volume into multi-dimensional sub-volumes of seismic data. The instructions also cause the one or more processors to process each of the multi-dimensional sub-volumes of seismic data in the convolutional neural network, and identify the subsurface structure in the input migrated seismic volume based on a probability map of the input migrated seismic volume generated by the convolutional neural network. The multi-dimensional sub-volumes are at least three dimensional.

In another implementation, a method for identifying a subsurface structure includes applying a plurality of multi-dimensional sub-volumes of a first input migrated seismic volume to train a volumetric convolutional neural network to identify the subsurface structure in the input migrated seismic volume, and produce a trained convolutional neural network. A second input migrated seismic volume is partitioned into multi-dimensional sub-volumes of seismic data. Each of the multi-dimensional sub-volumes of the second input migrated seismic volume is processed by the trained convolutional neural network. A probability map for the second input migrated seismic volume is generated based on output of the trained convolutional neural network. The subsurface structure is identified in the second input migrated seismic volume based on the probability map. The multi-dimensional sub-volumes are at least three dimensional.

In a further implementation, a non-transitory computer-readable medium encoded with instructions that when executed cause one or more processors to partition an input migrated seismic volume into multi-dimensional sub-volumes of seismic data, and apply the multi-dimensional sub-volumes to produce a trained convolutional neural network by training a volumetric convolutional neural network to identify a subsurface structure in the input migrated seismic volume. The multi-dimensional sub-volumes are at least three dimensional.

BRIEF DESCRIPTION OF THE DRAWINGS

For a detailed description of various examples, reference will now be made to the accompanying drawings in which.

DETAILED DESCRIPTION

Certain terms have been used throughout this description and claims to refer to particular system components. As one skilled in the art will appreciate, different parties may refer to a component by different names. This document does not intend to distinguish between components that differ in name but not function. In this disclosure and claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections. The recitation "based on" is intended to mean "based at least in part on." Therefore, if X is based on Y, X may be a function of Y and any number of other factors. A "channel" is a linear, commonly concave-based depression through which water and sediment flow and into which sediment can be deposited in distinctive, often elongated bodies.

Interpretation of large seismic volumes is a daunting task, especially so if performed manually. The amount of seismic data collected, and available for interpretation, is expected to increase as the need for energy increases, and seismic data acquisition techniques improve to reduce the cost of seismic surveys. Accordingly, systems that automate the process of seismic interpretation are needed to reduce the overall time and expense associated with seismic interpretation.

The seismic interpretation systems and methods disclosed herein reduce the time required to identify subsurface geological structures by using machine learning techniques to automate geo-body segmentation. A geo-body is a volume of rock material bounded by a surface that delineates a specific object with measurable geometry. Conventional seismic data interpretation can be time consuming and extremely expensive. Systems of the present disclosure may reduce the time required for geo-body segmentation by a factor of 1000 or more, with attendant reduction in the cost of performing the segmentation.

The seismic interpretation system includes a convolutional neural network trained to identify geo-bodies, such as channel geo-bodies or salt geo-bodies. The convolutional neural network receives an input migrated seismic volume as input and processes the input migrated seismic volume to identify the geo-bodies in accordance with the training applied to the convolutional neural network. As used herein, an "input migrated seismic volume" refers to regularly sampled subsurface images resulting from seismic data processing, such as a seismic depth migration result, a seismic time migration result, subsequent seismic time or depth inversion results, but also cruder binned and stacks. Such "images" are typically in three dimensions, but could be of higher dimension. In some implementations of the seismic interpretation system, the convolutional neural network is a fully convolutional network that processes a two-dimensional input migrated seismic volume to produce two-dimensional slices of a geo-body. In such systems, the two-dimensional slices are combined to produce a three-dimensional image of the geo-body. In other implementations of the seismic interpretation system, the convolutional neural network is a volumetric convolutional neural network that processes a three-dimensional input migrated seismic volume to produce a three-dimensional geo-body volume.

The training of the convolutional neural networks includes generating a set of training data with geo-bodies labeled by one or more seismic data interpretation experts. For a fully convolutional network, the sets of training data include two-dimensional input migrated seismic volumes, and for a volumetric convolutional neural network, the sets of training data include three-dimensional input migrated seismic volumes. The training data is applied to the convolutional neural network, the results are compared to the labeling, and the weight values applied in the convolutional neural network are adjusted with each pass to improve the results produced in segmenting the training data. In some implementations of the seismic interpretation system, the training process is accelerated by simultaneous launching multiple instances of a convolutional neural network and training the different convolutional neural networks using different hyperparameters. The training results are scored and an instance of the trained convolutional neural network producing the best segmentation score may be selected for deployment. In this manner, the convolutional neural network training time and cost may be reduced (e.g., by a factor of 10 or more).

Figure 1:
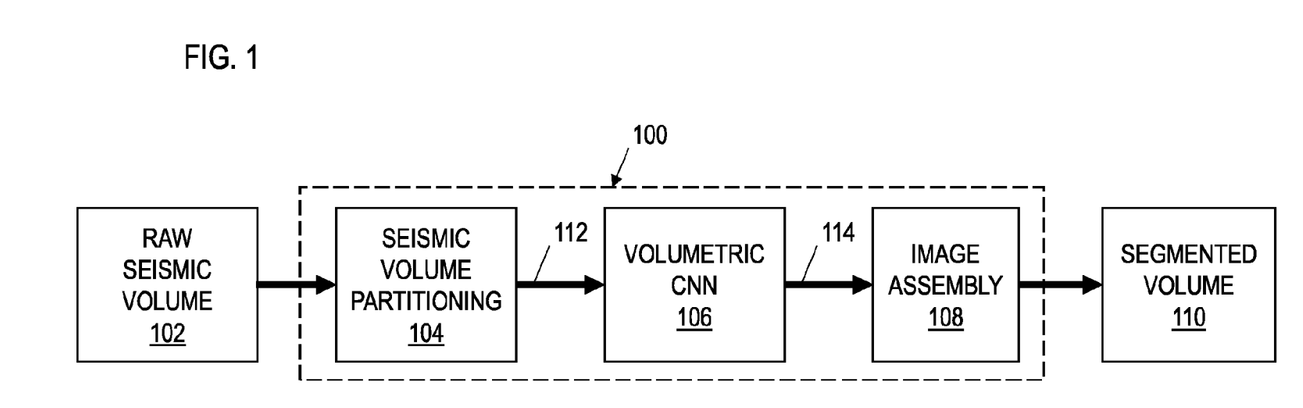
FIG. 1 shows a block diagram for a system for identifying subsurface structures in a seismic volume in accordance with the present disclosure.

FIG. 1 shows a block diagram for a system 100 for identifying subsurface structures in a seismic volume in accordance with the present disclosure. The system 100 includes seismic volume partitioning 104, a volumetric convolutional neural network 106, and image assembly 108. The system 100 receives as input an input migrated seismic volume 102. The input migrated seismic volume 102 may be provided to the system 100 in SEG-Y format or other format used to record and/or store seismic data.

The input migrated seismic volume 102 may be relatively large (e.g., up to terabytes). The input migrated seismic volume 102 is too large to be processed by the volumetric convolutional neural network 106 as a unit. To facilitate processing by the volumetric convolutional neural network 106, the seismic volume partitioning 104 subdivides or partitions the input migrated seismic volume 102 into multiple three-dimensional sub-volumes 112 of a size suitable for processing by the volumetric convolutional neural network 106. For example, the seismic volume partitioning 104 may partition the input migrated seismic volume 102 into three-dimensional sub-volumes 112 of 128×128×64 pixels, or other sub-volume size suitable for processing by the volumetric convolutional neural network 106. In various implementations of the system 100, the seismic volume partitioning 104 partitions the input migrated seismic volume 102 into non-overlapping three-dimensional sub-volumes 112 or overlapping three-dimensional sub-volumes 112. The seismic volume partitioning 104 may also normalize the amplitude of the input migrated seismic volume provided to the volumetric convolutional neural network 106 to bring the seismic amplitudes within a predetermined range.

The volumetric convolutional neural network 106 processes the three-dimensional sub-volumes 112 to generate probability values 114 that represent the likelihood that each pixel of three-dimensional sub-volumes 112 is part of sub-surface structure, such as a channel. The volumetric convolutional neural network 106 may include a plurality of volumetric convolutional layers that process the three-dimensional sub-volumes 112 to identify various features that are indicative of a subsurface structure, such as a channel, that the volumetric convolutional neural network 106 is trained to identify.

The image assembly 108 receives the probability values 114 generated by the volumetric convolutional neural network 106 and combines the probability values 114 to generate the segmented volume 110. The segmented volume 110 may be equivalent in size to the input migrated seismic volume 102, and include information identifying sub-surface structures in the input migrated seismic volume 102.

Figure 2:
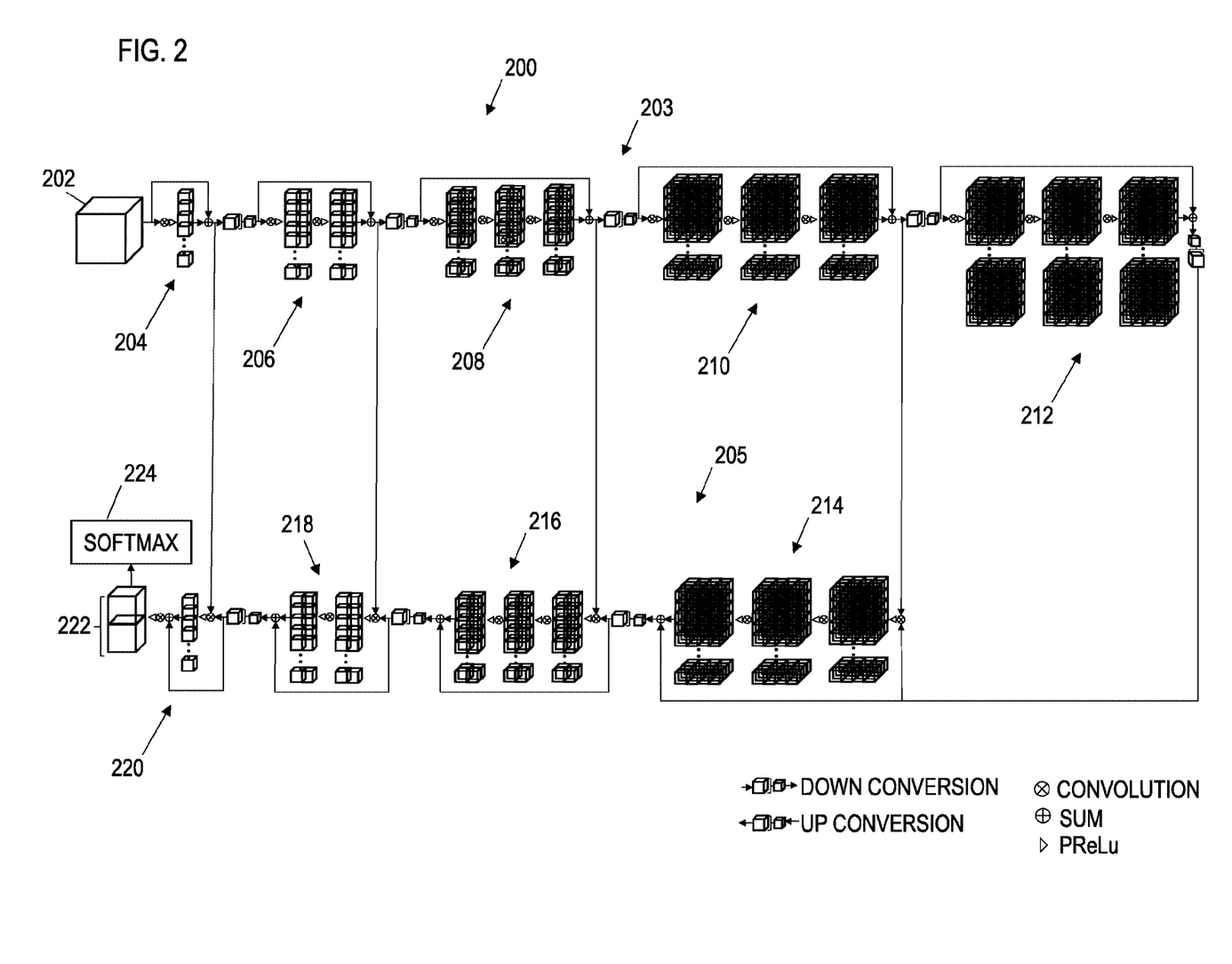
FIG. 2 shows a schematic level diagram for a volumetric convolutional neural network applied in the system of FIG. 1.

FIG. 2 shows a schematic level diagram for a volumetric convolutional neural network 200. The volumetric convolutional neural network 200 is an implementation of the volumetric convolutional neural network 106 of the system 100. The volumetric convolutional neural network 200 processes the sub-volume 202 to identify sub-surface structures in the sub-volume 202. The sub-volume 202 is an instance of the three-dimensional sub-volumes 112. The volumetric convolutional neural network 200 includes a compression path 203 that reduces resolution and a decompression path 205 that increases resolution to the resolution of the sub-volume 202. The compression path 203 includes stage 204, stage 206, stage 208, stage 210, and stage 212. The decompression path 205 includes stage 214, stage 216, stage 218, and stage 220. Volumetric convolutions (5×5×5 voxels) are performed at each stage (each stage includes 1-3 convolutional layers) to extract features that are indicative of sub-surface structures from the sub-volume 202. For example, stage 204 and stage 206 may identify fine low-level features, such as dots, lines, curves, and high intensity pixels in the sub-volume 202. Stage 208 and stage 210 may identify mid-level features, such as corners, blobs, and contours in the sub-volume 202. Stage 212 may identify high-level features such as broad patterns and object locations. Stage 214, stage 216, stage 218, and stage 220 combine the low-level features and the high-level features identified in the compression path 203.

In each stage, input is provided to the convolution layers for feature identification and added to the output of the stage. In the compression path 203, each successive stage includes more features identification channels (e.g., twice the number of channels in each successive stage). In the decompression path 205, each successive stage includes fewer features identification channels (e.g., half the number of channels in each successive stage). Following the stage 204, the stage 206, the stage 208, and the stage 210 down-conversion convolution is provided to reduce resolution. Following the stage 212, the stage 214, the stage 216, and the stage 218 up-conversion deconvolution is provided to increase resolution. Features extracted in the compression path 203 are forwarded to the decompression path 205 to reduce loss of detail in the compression path 203. For example, output of the stage 204 is passed to the input of the stage 220, output of the stage 206 is passed to the input of the stage 218, etc. Parametric rectified linear unit (PreLu) layers are included with each convolution.

Implementations of the volumetric convolutional neural network 200 may apply a weighted loss function, such as a weighted binary cross entropy loss function. Values of the weighted loss function are derived from a seismic volume (e.g., the fraction of the seismic volume that is a sub-surface structure).

The stage 220 outputs two feature maps 222. Soft-max processing 224 may be applied to the 222 to produce a segmentation of the sub-volume 202 that identifies pixels of the sub-volume 202 as either belonging to a sub-surface structure or background.

Figure 3:
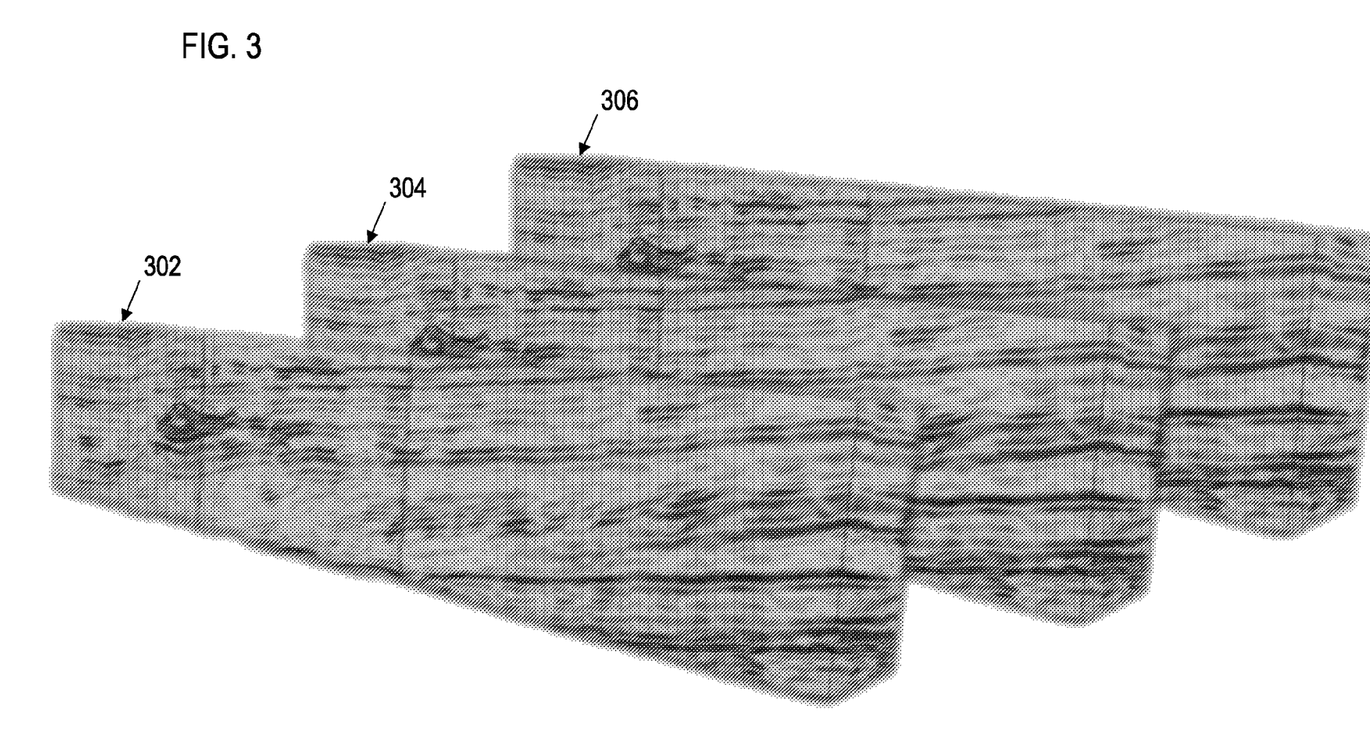
FIG. 3 shows an example of three-dimensional sub-volumes of seismic data provided to the volumetric convolutional neural network for use in identifying a subsurface structure.

FIG. 3 shows an example of three-dimensional sub-volumes 302-306 of an input migrated seismic volume provided to the volumetric convolutional neural network 200 for use in identifying a subsurface structure. The three-dimensional sub-volumes 302-306 are examples of the three-dimensional sub-volumes 112 and the three-dimensional sub-volume 202.

Figure 4:
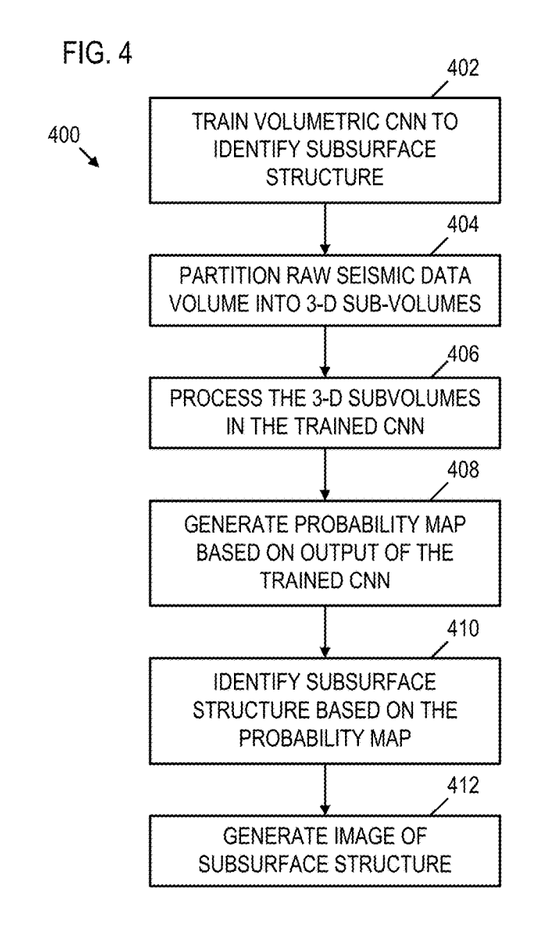
FIG. 4 shows a flow diagram for an example method for identifying subsurface structures using a volumetric convolutional neural network in accordance with the present disclosure.

FIG. 4 shows a flow diagram for an example method 400 for identifying subsurface structures using a volumetric convolutional neural network in accordance with the present disclosure. Though depicted sequentially as a matter of convenience, at least some of the actions shown can be performed in a different order and/or performed in parallel. Additionally, some implementations may perform only some of the actions shown.

In block 402, the volumetric convolutional neural network 106 is trained to identify a sub-surface structure in the input migrated seismic volume 102. The training may include acquiring seismic data that includes images of one or more sub-surface structures. The seismic data is analyzed to identify the sub-surface structures, and identified sub-surface structures are labeled. The labeled seismic data is partitioned to produce sub-volumes suitable for processing by the volumetric convolutional neural network 106, and applied to train the volumetric convolutional neural network 106. The training includes comparing results of processing by the volumetric convolutional neural network 106 to the labeled seismic data and back-propagating the results to the volumetric convolutional neural network 106 to improve identification of the various features of the subsurface structure.

In block 404, training of the volumetric convolutional neural network 106 is complete, and the trained volumetric convolutional neural network 106 is to be applied to process the input migrated seismic volume 102. The seismic volume partitioning 104 subdivides the input migrated seismic volume 102 into three-dimensional sub-volumes 112 suitable for processing by the volumetric convolutional neural network 106.

In block 406, the volumetric convolutional neural network 106 processes each of the three-dimensional sub-volumes 112 to identify a sub-surface structure in the three-dimensional sub-volumes 112.

In block 408, probability values output by the volumetric convolutional neural network 106 for each of the three-dimensional sub-volumes 112 are combined by the image assembly 108 to generate a probability map for the input migrated seismic volume 102.

In block 410, the probability values of the map produced in block 408 are resolved to identify a sub-surface structure in the input migrated seismic volume 102. For example, pixels having a sub-surface structure probability value higher than a predetermined threshold are deemed to identify a sub-surface structure.

In block 412, an image of the sub-surface structure is generated. The image may label each pixel of the input migrated seismic volume 102 as a sub-surface structure identified by the volumetric convolutional neural network 106 or as background based on the results of processing the input migrated seismic volume 102 in blocks 404-410.

Figure 5:
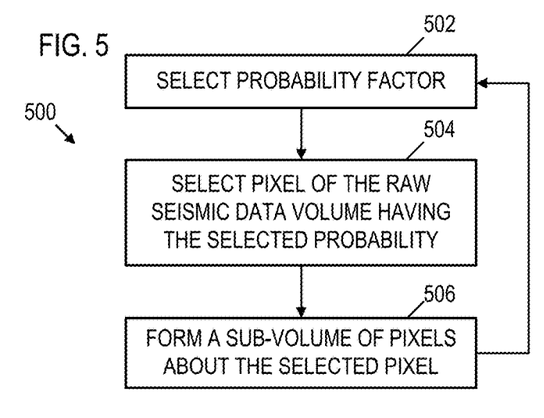
FIG. 5 shows a flow diagram for an example method for selecting sub-volumes of an input migrated seismic volume for use in training a volumetric convolutional neural network to identify subsurface structures in accordance with the present disclosure.

FIG. 5 shows a flow diagram for an example method 500 for selecting sub-volumes of an input migrated seismic volume for use in training a volumetric convolutional neural network to identify subsurface structures in accordance with the present disclosure. Though depicted sequentially as a matter of convenience, at least some of the actions shown can be performed in a different order and/or performed in parallel. Additionally, some implementations may perform only some of the actions shown. The method 500 may be performed as part of the operations of block 402 of the method 400.

Because sub-surface structures, such as channels, are extremely sparse in a seismic data volume (e.g., 1% of the pixels of seismic data volume may represent a subsurface structure to be identified), data applied to train the volumetric convolutional neural network 106 may be highly imbalanced in favor of background. To improve training of the volumetric convolutional neural network 106, the method 600 applies a biased sampling technique to select the sub-volumes applied to train the volumetric convolutional neural network 106.

In block 502, a probability value (p) is selected. The probability value will be applied to select sub-volumes of seismic data used to train the volumetric convolutional neural network 106. The probability value may be selected at the start of training to optimize training of the volumetric convolutional neural network 106.

In block 504, the probability value is used to select a pixel of the input migrated seismic volume. The pixel is selected to have probability (p) of being part of a subsurface structure.

Figure 9:
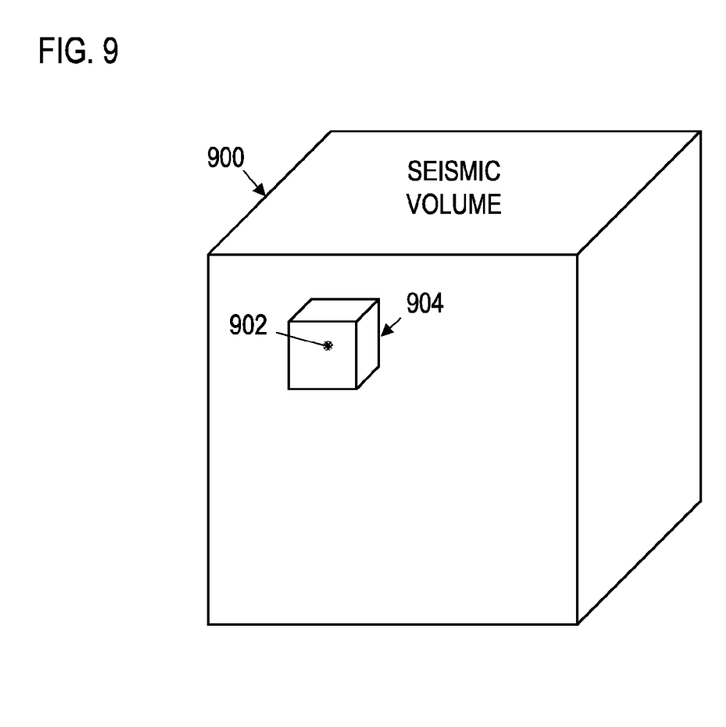
FIG. 9 shows an example of a sub-volume of an input migrated seismic volume selected based on probability of sub-surface structure presence for use in training a volumetric convolutional neural network in accordance with the present disclosure.

In block 506, pixels about the selected pixel are chosen to form a sub-volume used to train the volumetric convolutional neural network 106. For example, the selected pixel may be at the center of a cuboid arrangement of pixels forming a sub-volume of the seismic data volume. FIG. 9 shows an example of a sub-volume 904 of an input migrated seismic volume 900 selected based on pixel 902 having at least a probability (p) of being part of a sub-surface structure.

Figure 6:
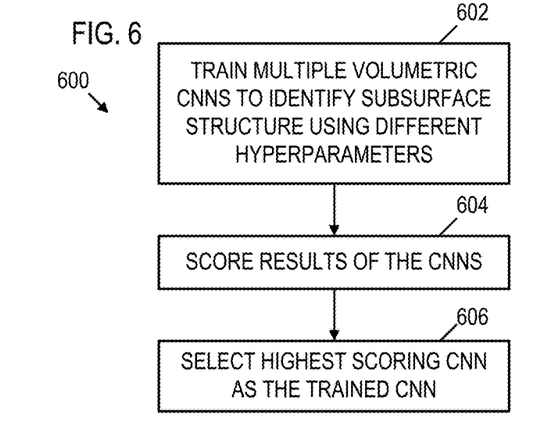
FIG. 6 shows a flow diagram for an example method for accelerated training of a volumetric convolutional neural network to identify subsurface structures in accordance with the present disclosure.

FIG. 6 shows a flow diagram for an example method 600 for accelerated training of a volumetric convolutional neural network to identify subsurface structures in accordance with the present disclosure. Though depicted sequentially as a matter of convenience, at least some of the actions shown can be performed in a different order and/or performed in parallel. Additionally, some implementations may perform only some of the actions shown. The method 600 may be performed as part of the operations of block 402 of the method 400. The method 600 may accelerate training of the volumetric convolutional neural network 106 by a factor of 10 or more.

In block 602, multiple instances of the volumetric convolutional neural network 106 are simultaneously trained using different hyperparameter values. The hyperparameters varied across the different instances of the volumetric convolutional neural network 106 may include: the probability applied to biased sampling of training sub-volumes, learning rate, batch size, training size, number of epochs, dropout probability, learning rate decay rate, etc. The instances of the volumetric convolutional neural network 106 may be implemented using virtual machines or other virtual computing devices provided via a cloud based computing system to allow for training of any number of instances of the volumetric convolutional neural network 106.

In block 604, training of the multiple instances of the volumetric convolutional neural network 106 is complete, and the computing resources applied in the training are released. The results of the training are scored. For example, for each instance of the volumetric convolutional neural network 106, an F1 score may computed using the labeled training data and segmentation results generated by operation of the volumetric convolutional neural network 106.

In block 606, the instance of the volumetric convolutional neural network 106 producing the highest score may be selected to be the trained volumetric convolutional neural network 106.

Figure 7:
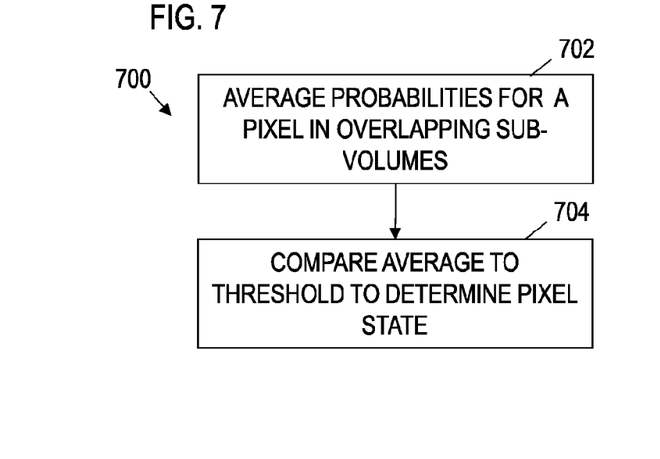
FIGS. 7 and 8 show flow diagrams for example methods for selecting a pixel state if overlapping sub-volumes of an input migrated seismic volume are processed by a volumetric convolutional neural network in accordance with the present disclosure.

FIG. 7 shows a flow diagram for an example method 700 for selecting a pixel state if overlapping sub-volumes of an input migrated seismic volume are processed by the volumetric convolutional neural network 106. Though depicted sequentially as a matter of convenience, at least some of the actions shown can be performed in a different order and/or performed in parallel. Additionally, some implementations may perform only some of the actions shown. The method 700 may be performed as part of the operations of block 408 of the method 400.

In the method 700, the three-dimensional sub-volumes 112 provided to the volumetric convolutional neural network 106 are overlapping. Due to the overlapping three-dimensional sub-volumes 112, for a given pixel of the input migrated seismic volume 102, multiple probability values may be generated (e.g., a probability value for each three-dimensional sub-volume 112 that includes the pixel). In block 702, the image assembly 108 statistically aggregates the probability values generated for a given pixel. Statistical aggregation may include computation of arithmetic mean, weighted mean, median, harmonic mean, etc. of the probability values generated for the given pixel.

In block 704, the image assembly 108 applies a decision function to the probability produced by statistical aggregation in block 702 to determine pixel state. For example, if the probability exceeds a threshold, then the pixel is deemed part of a sub-surface structure, and is otherwise deemed part of background.

Figure 8:
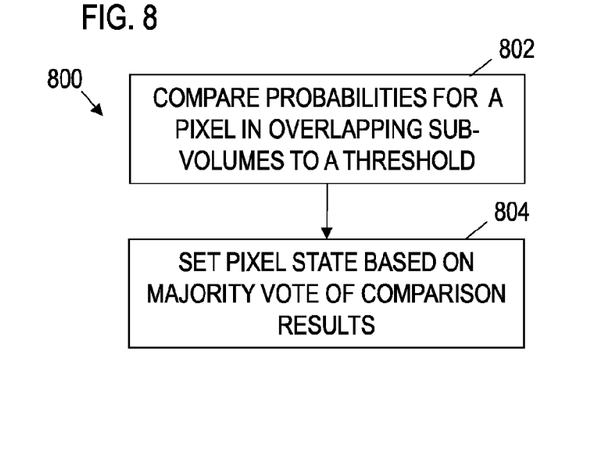

FIG. 8 shows a flow diagram for an example method 800 for selecting a pixel state if overlapping sub-volumes of an input migrated seismic volume are processed by the volumetric convolutional neural network 106. Though depicted sequentially as a matter of convenience, at least some of the actions shown can be performed in a different order and/or performed in parallel. Additionally, some implementations may perform only some of the actions shown. The method 800 may be performed as part of the operations of block 408 of the method 400.

In the method 800, the three-dimensional sub-volumes 112 provided to the volumetric convolutional neural network 106 are overlapping. Due to the overlapping three-dimensional sub-volumes 112, for a given pixel of the input migrated seismic volume 102, multiple probability values may be generated (e.g., a probability value for each three-dimensional sub-volume 112 that includes the pixel). In block 802, the image assembly 108 applies a decision function to each of the probability values generated for a given pixel. For example, the image assembly 108 may compare each of the probability values generated for the given pixel to a threshold value.

In block 804, the image assembly 108 sets pixel state based on majority of vote of the comparison results produced in block 802. For example, if a majority of the probability values exceeds the threshold, then the pixel is deemed part of a sub-surface structure, and otherwise is deemed part of background.

Figure 10:
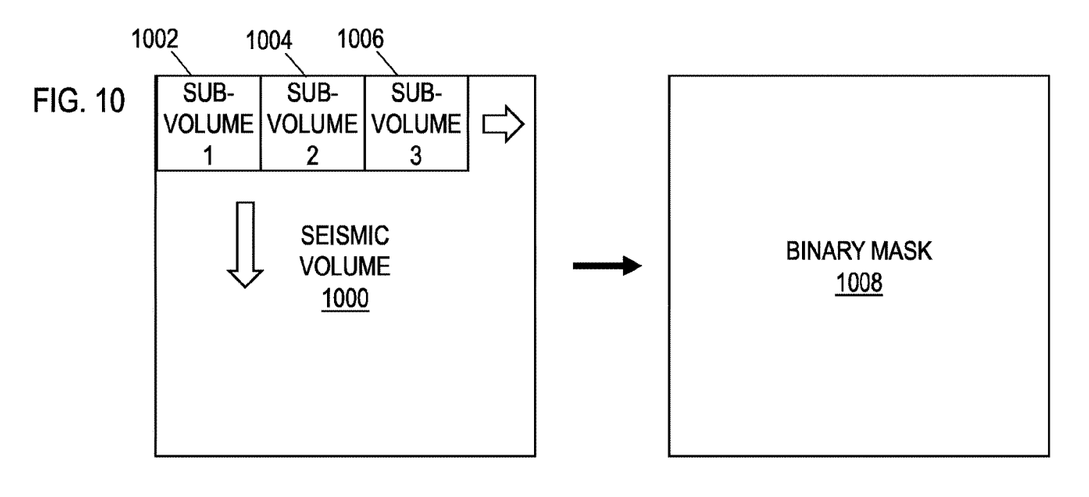
FIG. 10 shows an example of construction of a binary mask for a segmented seismic volume based on non-overlapping sub-volumes in accordance with the present disclosure.

FIG. 10 shows an example of construction of a binary mask for a segmented seismic volume based on non-overlapping three-dimensional sub-volumes 112 in accordance with the present disclosure. The seismic volume partitioning 104 divides the input migrated seismic volume 1000 into non-overlapping sub-volumes 1002, 1004, 1006, etc. While depicted as two-dimensional, the input migrated seismic volume 1000 and the sub-volumes 1002-1006 are three-dimensional. The sub-volumes 1002-1006 are provided to the volumetric convolutional neural network 106, and the probability values 114 and/or the pixel state values generated by the volumetric convolutional neural network 106 for each sub-volume are likewise arranged in non-overlapping fashion to form the binary mask 1008. The binary mask 1008 specifies whether each pixel of the input migrated seismic volume 1000 corresponds to a sub-surface structure or background.

Figure 11:
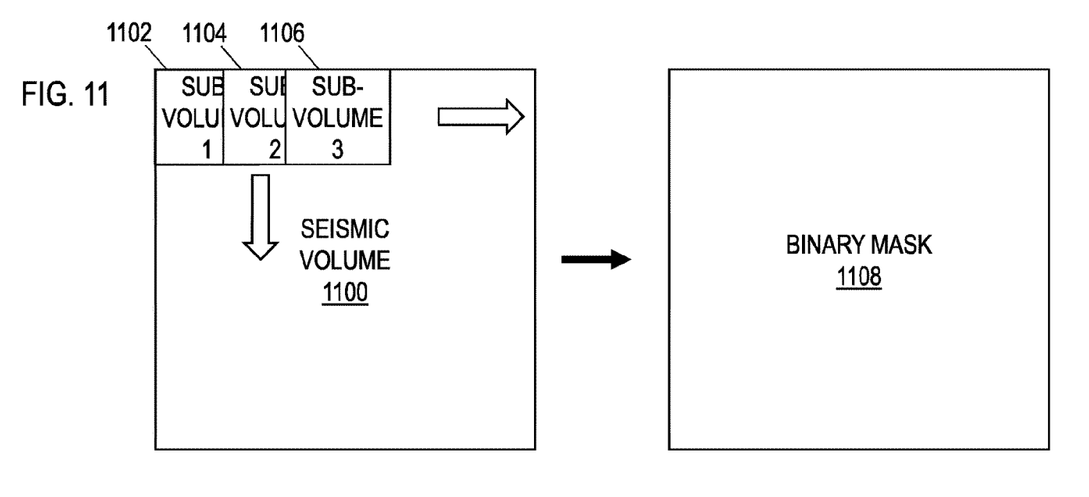
FIG. 11 shows an example of construction of a binary mask for a segmented seismic volume based on overlapping sub-volumes in accordance with the present disclosure.

FIG. 11 shows an example of construction of a binary mask for a segmented seismic volume based on overlapping sub-volumes in accordance with the present disclosure. The seismic volume partitioning 104 divides the input migrated seismic volume 1100 into overlapping sub-volumes 1102, 1104, 1106, etc. While depicted as two-dimensional, the input migrated seismic volume 1100 and the sub-volumes 1102-1106 are three-dimensional. The amount (the number of pixels) of overlap of the sub-volumes in X, Y, and Z directions can vary in implementations of the system 100. The sub-volumes 1102-1106 are provided to the volumetric convolutional neural network 106, and the probability values 114 are processed using the method 700 or the method 800 to determine the pixel state values for the binary mask 1108. The binary mask 1108 specifies whether each pixel of the input migrated seismic volume 1100 corresponds to a sub-surface structure or background.

Figure 12:
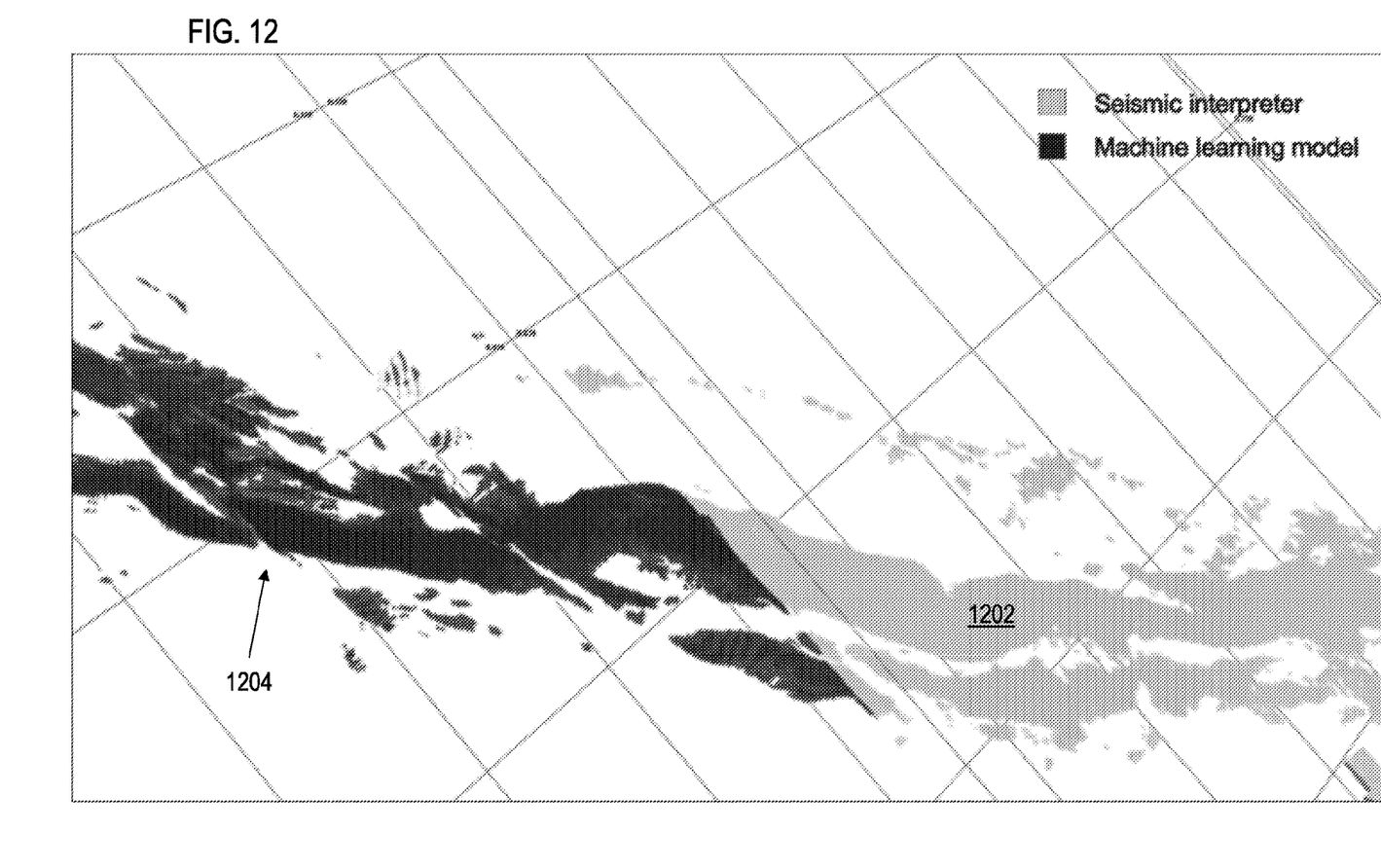
FIG. 12 shows an example of a subsurface structure identified using a volumetric convolutional neural network in accordance with the present disclosure.

FIG. 12 shows an example of a subsurface structure identified using the volumetric convolutional neural network 106. In FIG. 12, the area 1202 is area of sub-surface structure identified by a human expert. An input migrated seismic volume, with the area 1202 labeled as sub-surface structure was used to train the volumetric convolutional neural network 106. After training, the input migrated seismic volume was processed by the system 100, and the system 100 identified the area 1204 as sub-surface structure. The area 1204 closely correlates with area of the subsurface structure identified by the human expert over which the area 1204 is overlaid in FIG. 12.

Figure 13:
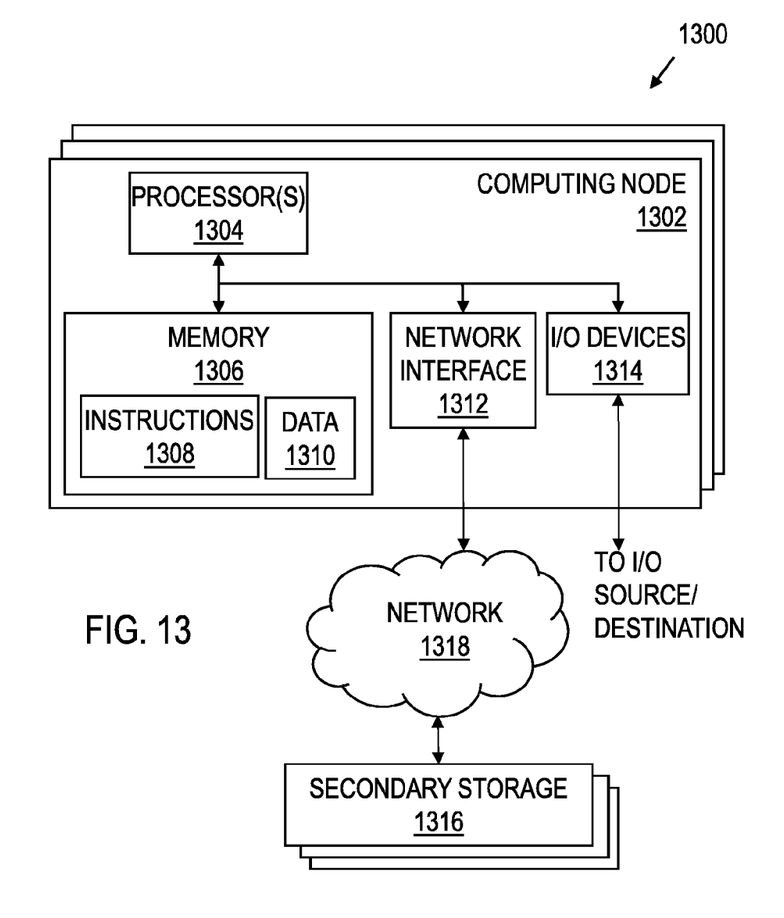
FIG. 13 shows a block diagram for an example computing system suitable for implementation of a system for identifying subsurface structures in seismic volume in accordance with the present disclosure.

FIG. 13 shows a block diagram for a computing system 1300 suitable for implementation of the system 100. Examples of the computing system 1300 may be applied to implement the seismic volume partitioning 104, the volumetric convolutional neural network 106, and/or the image assembly 108. The computing system 1300 includes one or more computing nodes 1302 and secondary storage 1316 that are communicatively coupled (e.g., via the network 1318). One or more of the computing nodes 1302 and associated secondary storage 1316 may be applied to provide the functionality of seismic volume partitioning 104, the volumetric convolutional neural network 106, and/or the image assembly 108 described herein.

Each computing node 1302 includes one or more processors 1304 coupled to memory 1306, a network interface 1312, and the I/O devices 1314. In various embodiments, a computing node 1302 may be a uniprocessor system including one processor 1304, or a multiprocessor system including several processors 1304 (e.g., two, four, eight, or another suitable number). Processors 1304 may be any suitable processor capable of executing instructions. For example, in various embodiments, processors 1304 may be general-purpose or embedded microprocessors, graphics processing units (GPUs), or digital signal processors (DSPs) implementing any of a variety of instruction set architectures (ISAs). In multiprocessor systems, each of the processors 1304 may commonly, but not necessarily, implement the same ISA The memory 1306 may include a non-transitory, computer-readable storage medium configured to store program instructions 1308 and/or data 1310 accessible by processor(s) 1304. The memory 1306 may be implemented using any suitable memory technology, such as static random-access memory (SRAM), synchronous dynamic RAM (SDRAM), nonvolatile/Flash-type memory, or any other type of memory. Program instructions 1308 and data 1310 implementing the functionality disclosed herein are stored within memory 1306. For example, instructions 1308 may include instructions that when executed by processor(s) 1304 implement the seismic volume partitioning 104, the volumetric convolutional neural network 106, and/or the image assembly 108 disclosed herein.

Secondary storage 1316 may include volatile or non-volatile storage and storage devices for storing information such as program instructions and/or data as described herein for implementing the input migrated seismic volume 102, the seismic volume partitioning 104, the volumetric convolutional neural network 106, the image assembly 108, and/or the segmented volume 110. The secondary storage 1316 may include various types of computer-readable media accessible by the computing node 1302 via the network interface 1312. A computer-readable medium may include storage media or memory media such as semiconductor storage, magnetic or optical media, e.g., disk or CD/DVD-ROM, or other storage technologies.

The network interface 1312 includes circuitry configured to allow data to be exchanged between the computing node 1302 and/or other devices coupled to the network 1318. For example, the network interface 1312 may be configured to allow data to be exchanged between a first instance of the computing system 1300 and a second instance of the computing system 1300. The network interface 1312 may support communication via wired or wireless data networks.

The I/O devices 1314 allow the computing node 1302 to communicate with various input/output devices such as one or more display terminals, keyboards, keypads, touchpads, scanning devices, voice or optical recognition devices, or any other devices suitable for entering or retrieving data by one or more computing nodes 1302. Multiple input/output devices may be present in a computing system 1300.

Those skilled in the art will appreciate that the computing system 1300 is merely illustrative and is not intended to limit the scope of embodiments. In particular, the computing system 1300 may include any combination of hardware or software that can perform the functions disclosed herein. Computing node 1302 may also be connected to other devices that are not illustrated, in some embodiments. In addition, the functionality provided by the illustrated components may in some embodiments be combined in fewer components or distributed in additional components. Similarly, in some embodiments the functionality of some of the illustrated components may not be provided and/or other additional functionality may be available.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A subsurface structure identification system, comprising:
    one or more processors; and
    a memory coupled to the one or more processors, and encoded with instructions that when executed by the one or more processors cause the one or more processors to:
        provide a convolutional neural network trained to identify subsurface structures in input migrated seismic volumes;
        partition a first input migrated seismic volume into three-dimensional sub-volumes, wherein the three-dimensional sub-volumes are overlapping portions of the first input migrated seismic volume;
        process each of the three-dimensional sub-volumes in the convolutional neural network to produce a respective plurality of feature maps associated with each three-dimensional sub-volume;
        generate, for each three-dimensional sub-volume, a respective segmentation that identifies portions of the three-dimensional sub-volume as either belonging to sub-surface structure or background based on the respective plurality of feature maps associated with the three-dimensional sub-volume; and
        identify a first subsurface structure in the first input migrated seismic volume based on a probability map of the first input migrated seismic volume generated based on the segmentations associated with the three-dimensional sub-volumes.

2. The subsurface structure identification system of claim 1, wherein the convolutional neural network comprises a convolutional layer configured to provide volumetric convolution of seismic data.

3. The subsurface structure identification system of claim 1, wherein the instructions, when executed by the one or more processors, further cause the one or more processors to normalize amplitude of the first input migrated seismic volume.

4. The subsurface structure identification system of claim 1, wherein the instructions, when executed by the one or more processors, further cause the one or more processors to statistically aggregate a plurality of probability values produced by processing the three-dimensional sub-volumes.

5. The subsurface structure identification system of claim 1, wherein the instructions, when executed by the one or more processors, further cause the one or more processors to:
    apply a decision function to a plurality of probability values produced by processing the three-dimensional sub-volumes; and
    determine a pixel state based on a result of the decision function for each of the plurality of probability values.

6. The subsurface structure identification system of claim 1, wherein the first subsurface structure is a channel.

7. The subsurface structure identification system of claim 1, wherein a first three-dimensional sub-volume overlaps a second three-dimensional sub-volume by no more than 30%.

8. The subsurface structure identification system of claim 1, wherein the respective plurality of feature maps associated with each three-dimensional sub-volume is respective two feature maps associated with each three-dimensional sub-volume.

9. The subsurface structure identification system of claim 1, wherein the portions of each three-dimensional sub-volume that are identified as either belonging to sub-surface structure or background are represented by pixels.

10. A method for identifying a subsurface structure, comprising:
    applying a plurality of multi-dimensional sub-volumes of a first input migrated seismic volume to train a volumetric convolutional neural network to identify a subsurface structure in the first input migrated seismic volume, and produce a trained convolutional neural network;
    partitioning a second input migrated seismic volume into multi-dimensional sub-volumes of seismic data, wherein the multi-dimensional sub-volumes are overlapping portions of the second input migrated seismic volume;
    processing each of the multi-dimensional sub-volumes of the second input migrated seismic volume by the trained convolutional neural network to produce a respective plurality of feature maps associated with each multi-dimensional sub-volume of the second input migrated seismic volume;
    generating, for each sub-volume of the second input migrated seismic volume, a respective segmentation that identifies portions of the multi-dimensional sub-volume as either belonging to sub-surface structure or background based on the respective plurality of feature maps associated with the multi-dimensional sub-volume;
    generating a probability map for the second input migrated seismic volume based on the segmentations associated with the multi-dimensional sub-volumes of the second input migrated seismic volume; and
    identifying the subsurface structure in the second input migrated seismic volume based on the probability map;
    wherein the multi-dimensional sub-volumes are at least three dimensional.

11. The method of claim 10, further comprising applying biased sampling to select the multi-dimensional sub-volumes of the first input migrated seismic volume that are applied to train the volumetric convolutional neural network.

12. The method of claim 11, wherein applying the biased sampling comprises:
    selecting a first pixel of the first input migrated seismic volume, wherein the first pixel has at least a predetermined probability of being part of the subsurface structure; and
    selecting a set of pixels about the first pixel to form one of the multi-dimensional sub-volumes of the first input migrated seismic volume.

13. The method of claim 12, further comprising varying the predetermined probability in different instances of training the volumetric convolutional neural network.

14. The method of claim 10, wherein training the volumetric convolutional neural network comprises:
applying one or more back-propagation based optimization loops to minimize a weighted loss function that is applied to the volumetric convolutional neural network; and
deriving values of weights of the weighted loss function from the first input migrated seismic volume.

15. The method of claim 10, further comprising normalizing amplitude of the second input migrated seismic volume prior to processing of the multi-dimensional sub-volumes of the second input migrated seismic volume by the trained convolutional neural network.

16. The method of claim 10, further comprising:
statistically aggregating a plurality of probability values produced by processing the multi-dimensional sub-volumes; and
applying a decision function to a result of the statistically aggregating to determine a state of a pixel corresponding to the plurality of probability values.

17. The method of claim 10, further comprising:
applying a decision function to a plurality of probability values produced by processing the multi-dimensional sub-volumes; and
determining a state of a pixel corresponding to the plurality of probability values based on a result of the decision function for the plurality of probability values.

18. The method of claim 10, further comprising:
simultaneously training a plurality of instances of the volumetric convolutional neural network using the first input migrated seismic volume and different hyperparameter values in each of the plurality of instances;
after completion of the simultaneous training, comparing accuracy of identification of the subsurface structure by each of the plurality of instances; and
selecting an instance of the plurality of instances that most accurately identifies the subsurface structure as the trained convolutional neural network.

19. The method of claim 10, wherein a first multi-dimensional sub-volume overlaps a second multi-dimensional sub-volume by no more than 30%.

* * * * *